UNITED STATES PATENT OFFICE.

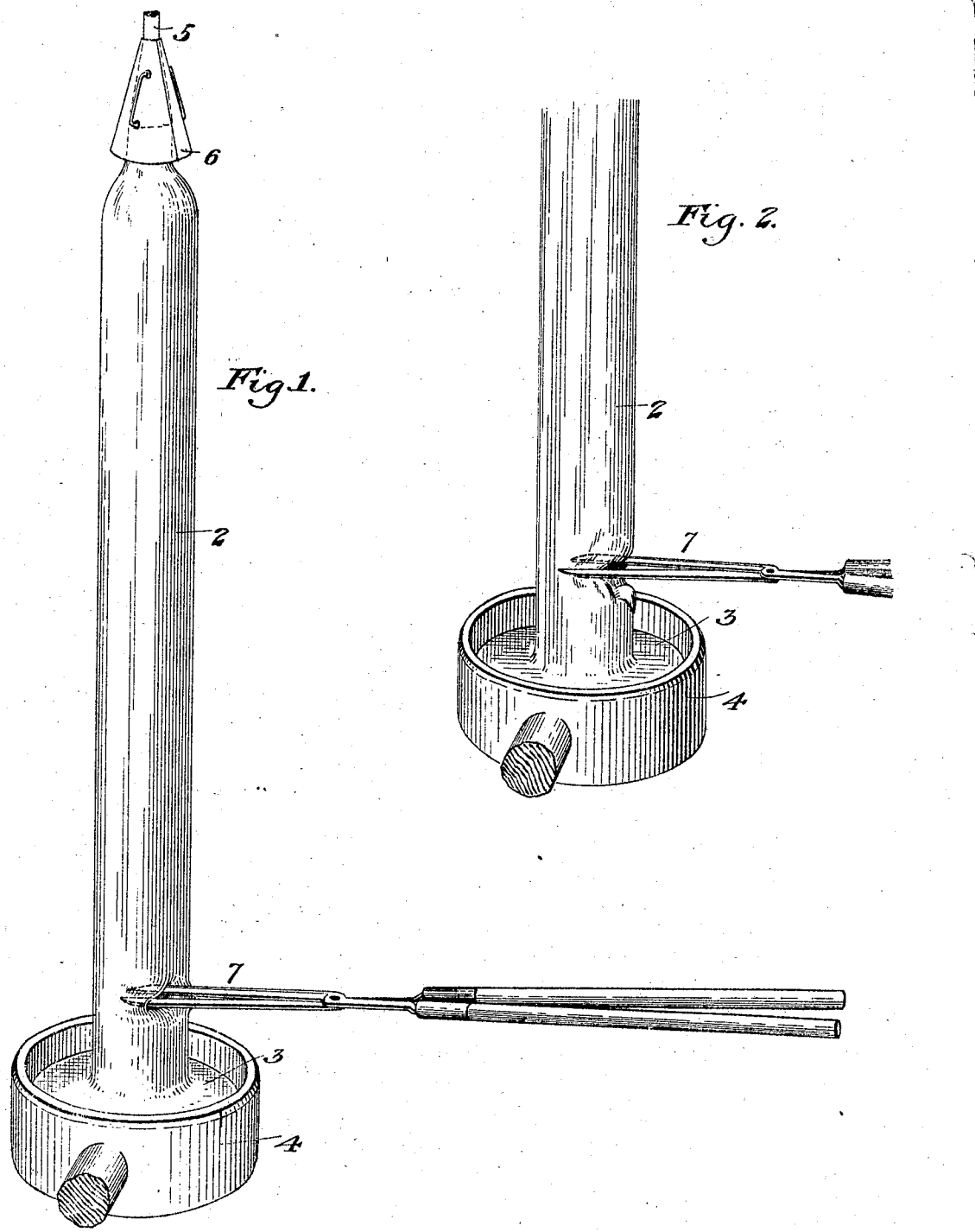

JAMES CAMPBELL, OF PITTSBURG, PENNSYLVANIA, ASSIGNOR TO JAMES A. CHAMBERS, TRUSTEE, OF PITTSBURG, PENNSYLVANIA.

METHOD OF SEVERING DRAWN-GLASS CYLINDERS.

No. 805,943. Specification of Letters Patent. Patented Nov. 28, 1905.

Application filed August 1, 1903. Serial No. 167,851.

*To all whom it may concern:*

Be it known that I, JAMES CAMPBELL, of Pittsburg, Allegheny county, Pennsylvania, have invented a new and useful Method of Severing Drawn-Glass Cylinders, of which the following is a full, clear, and exact description, reference being had to the accompanying drawings, forming part of this specification, in which—

Figure 1 shows in perspective view the operation of severing a glass cylinder from the plastic glass from which it is drawn. Fig. 2 is a similar view showing a subsequent stage of the operation.

In the drawing of window-glass cylinders from a body of molten glass it is important that at the end of the drawing operation the cylinder be separated from the molten body in a manner which involves no injury to the cylinder and as little waste of the glass as possible. My invention is designed to accomplish these desirable purposes; and it consists in severing the cylinder from the body of molten glass by making a perforation in the cylinder near its base and using this perforation as a starting-point to shear around the circumference of the cylinder until it is severed.

In Fig. 1 of the drawings, 2 represents the glass cylinder which is drawn from a body of molten glass 3, contained in a suitable receptacle 4, the drawing-tool being indicated at 5, the hood 6 being a device which is sometimes applied to retard the cooling of the glass near its connection with the drawing-tool. When it is desired to sever the drawn cylinder from the body of glass 2, I insert through its walls a pair of closed shears 7, the outer edges of whose points are sharp, so as to perforate the glass readily. By opening these shears somewhat the perforation in the cylinder is enlarged, and then by withdrawing the shears and using them in the manner in which shears are ordinarily used in cutting, as shown in Fig. 2, the operator cuts the somewhat plastic cylinder around its circumference until it is entirely severed from the portion of glass below. By proceeding in this way the body of the cylinder is not injured and there is very little waste of material.

The initial perforation of the glass may be formed otherwise than by the use of shears, since

What I claim is—

1. The method of separating drawn-glass cylinders from the body of glass from which they are drawn, which consists in perforating the wall of the cylinder near its base and then shearing the cylinder around its circumference; substantially as described.

2. The method of separating drawn-glass cylinders from the body of glass from which they are drawn, which consists in perforating the wall of the cylinder near its base, enlarging the opening thus formed and then shearing the cylinder around its circumference; substantially as described.

In testimony whereof I have hereunto set my hand.

JAMES CAMPBELL.

Witnesses:
   GEO. B. BLEMING,
   L. M. REDMAN.